Patented Sept. 19, 1922.

1,429,267

UNITED STATES PATENT OFFICE.

WILLIAM ACHTMEYER, OF MIDDLETOWN, CONNECTICUT.

PHENOLIC CONDENSATION PRODUCT AND METHOD OF MAKING SAME.

No Drawing.      Application filed March 10, 1921. Serial No. 451,345.

*To all whom it may concern:*

Be it known that I, WILLIAM ACHTMEYER, a citizen of the United States, and a resident of Middletown, in the county of Middlesex and State of Connecticut, have invented certain new and useful Improvements in Phenolic Condensation Product and Methods of Making Same, of which the following is a specification.

My invention relates to the manufacture of a synthetic resinous composition of matter which has many uses, the principal one being that of a friction composition and the object of my invention is to produce a compound which is non-inflammable, unaffected by water, oil and heat and which has a high resistance to abrasive wearing strains and having a high temperature carbonization.

A great variety of friction compounds are known, in which a large number of substances are used either alone or an admixture with each other, for example, bituminous material, gums, rosin, resins, rubber, tars, waxes, hydrocarbons, drying and oxidized oils, varnishes, asphalt, pitch, sugar, molasses, etc., and each of which has its inherent defects. Brake linings or blocks which have been impregnated with such compounds are softened and made sticky by the heat developed by friction, and cause annoying jerking and shaking when used in the brakes of vehicles. They carbonize at a very low temperature disintegrated more or less to a powdery condition and lose their power or resistance, and often the linings will rip off from the brake bands. Furthermore, they absorb oil and water and consequently permit slipping, or in cold weather, they may freeze on the brake drums. These defects not only cause annoyance but accidents as well.

I have discovered that by causing a reaction between a phenolic body and methylene-diphenyl-diamine, $CH_2(NHC_6H_5)_2$, I can produce a friction product of a far superior quality than those hitherto known. It is non-inflammable, and will not soften or become sticky under the highest heat, it will not be affected by water or oil, and therefore will not become gummy, greasy, or slippery. Brake parts made of asbestos which is either compounded or impregnated with this product will withstand temperatures up to 500° C., or higher without being injured thereby. My product not only withstands these high temperatures without injury, but subjection thereof to unusually high temperatures develops the most valuable qualities thereof including co-efficient of friction.

As an example of how I may prepare my product I place one-hundred (100) parts of phenol and seventy-five (75) to one-hundred (100) parts of methylene-diphenyl-diamine the parts being by weight in a steam jacketed open vessel provided with a stirring device. I heat the re-action mass with constant stirring until ebullition begins, and when the ebullition has ceased the mixture is again heated with constant stirring until the water which has formed by the re-action and which amounts to five or six per cent, is expelled. The product in the heated state is a thin fluid of low viscosity having a clear brownish color with a peculiar rancid odor, and having a more fatty consistency than the well known phenolic condensation products. When dropped on paper an oily mark results, and it is semi-solid when cold. This product will not go over into the insoluble or infusible condition at any temperature, but when mixed with seven to ten per cent of paraformaldehyde or trioxymethylene it combines therewith and will then change under continuous subjection to a high temperature to a very hard infusible and insoluble condensation product. Before being converted into the insoluble state, it is soluble in acetone, alcohols and hot benzol.

For impregnation purposes it is best to dissolve it in a small amount of a high boiling solvent for example from ten to fifteen percent of amylalcohol or acetate or fusel oil or mixtures thereof. Upon heating the friction compound to sixty or seventy degrees C. the viscosity decreases, and it becomes sufficiently thin to easily penetrate the body to be treated. According to a variation of my process a solution of one-hundred (100) parts phenol dissolved in twenty to twenty-five parts of forty-per cent formaldehyde solution and seventy-five to one-hundred parts of methylene-diphenyl-diamine are placed within a closed steam jacketed vessel provided with a reflux condenser and a stirring device. The mass is then heated with continual stirring until brisk ebullition ensues, and when the ebullition has ceased the heating is continued with stirring until the odor of formaldehyde has disappeared, whereupon it may be drawn into an open vessel to cool. The re-action water which may amount to fifteen to twenty per cent is removed, whereupon the mass is heated again to ninety to one-hundred degrees C. for about one hour or until the last traces of water are expelled in the open vessel with stirring.

Continuous heating at higher temperatures converts it into a hard insoluble mass, and before the change into the insoluble and infusible condition, it may be treated as in the preceding example. My composition when heated is a thin fluid of low viscosity and readily penetrates and impregnates cellular and porous bodies. It may be thinned down with ten to fifteen per cent of amyl acetate or alcohol. Methyl or ethyl alcohol or hot benzol may be used if desired, but the amylacetate or alcohol is preferred on account of its lower volatility. The solution easily penetrates and impregnates objects made of asbestos or other material and the impregnation may be carried out when desired under vacuum or increased pressure. My friction compound contracts but very slightly on solidification and it has a very low temperature co-efficient of expansion. Objects being impregnated therewith will not swell or expand, but shrink only slightly during the heating and hardening process. After removal of the solvent and drying the impregnated objects somewhat, they are subjected in a suitable oven to the hardening process. The oven is heated up to about one-hundred degrees (100°) C. and the temperature thereof is slowly and steadily increased. When a temperature of one-hundred and fifty degrees (150°) C. is reached, my material is insoluble and infusible, and at two-hundred and fifty (250°) to two-hundred and seventy-five (275°) degrees C., it begins to smoke, and the color thereof changes to a dark brown. At three-hundred and twenty-five degrees C. (325° C.) to three-hundred and fifty degrees C. (350° C.) the evolution of smoke ceases and the color is a blackish brown, and at three hundred and seventy-five (375) to four-hundred (400) degrees C., the heating is interrupted and the object removed from the oven. Articles made by my process could be heated to still higher temperatures without injury thereof but at the temperature given they have been sufficiently heated or cured to develop the qualities desirable in a brake.

Brake linings or shoes impregnated with this friction compound and hardening in this manner will not become soft, sticky, glossy or slippery when hot, or when wet with water or oil. They will effect smooth non-jerking braking action, and will exert a high degree of friction and will cause any moving body, no matter what the speed, to come smoothly to a stop in a very short time.

Instead of impregnating asbestos or other articles with my compound the article may be molded from a composition of matter composed of asbestos or other material and my new friction product. No matter how formed they change under the action of heat under ordinary pressure into a very dense and compact product, which will withstand higher temperature without injury better than any other brake lining treated with condensation products or other compounds.

In the case of the well known friction compound previously used, not only is the compound itself destroyed but the asbestos or other fibrous material combined therewith becomes weak so that it falls almost to powder when subjected to the above mentioned high temperatures which is not the case when my compound is used. Objects treated with my friction compound are more pliable and flexible than those treated with other synthetic resinous compositions.

Commercial carbolic acid, cresol or other equivalents of phenol may be used in place thereof. I have found that by increasing the amount of paraformaldehyde or trioxymethylene from seven to ten per cent, to fifteen to twenty per cent, or the forty per cent formaldehyde solution from twenty to twenty-five per cent, to thirty to forty per cent, I can use naphthol in place of phenol.

A re-action product of phenol and methylene-diphenyl-diamine will not per se form an infusible and insoluble condensation product at any temperature, and in order to change it into such condition, it is essential that some methylene compound be combined therewith. My re-action product combined with the additional active methylene hardener is more suitable for hot impregnation than any other phenolic condensation product which changes on heating directly into the insoluble state. All the known phenolic condensation products thicken with the lapse of time even at room temperatures if such products are heated, even though only for a short time, up to sixty to seventy degrees C., and becoming so thick and viscous as not to have any value as an impregnating compound. My new friction compound however will not thicken unduly when subjected to this temperature for a comparatively long time.

I claim:—

1. As a new composition of matter, a condensation product of a phenolic body, and methylene-diphenyl-diamine.

2. The process which consists in causing a re-action between phenol and methylene-diphenyl-diamine and removing the water formed by the re-action.

3. The process which consists in causing the re-action between one-hundred parts of phenol, and seventy-five to one-hundred parts of methylene-diphenyl-diamine, and removing the water formed in the re-action.

4. The process which consists in causing a re-action between phenol and methylene-diphenyl-diamine and removing the water formed by the re-action, adding a hardening methylene compound to the product and heating the mixture.

5. The process which consists in causing a re-action between one-hundred parts of phenol and seventy-five to one-hundred parts of methylene-diphenyl-diamine, and removing the water formed in the re-action, adding seven to ten per cent of a methylene compound to the product and heating the mixture.

6. A condensation product of phenol and methylene-diphenyl-diamine which is thinly fluid at sixty to seventy degrees C.

7. The process of causing a re-action between phenol, formaldehyde, and methylene-diphenyl-diamine and removing the water formed by the reaction.

WILLIAM ACHTMEYER.